United States Patent [19]

Albrecht et al.

[11] 4,425,795

[45] Jan. 17, 1984

[54] DEVICE FOR THE ELECTRIC MONITORING OF THE LEVEL OF A LIQUID CONTAINED IN A CONTAINER

[75] Inventors: Klaus Albrecht, Liederbach; Martin Haub, Steinbach, both of Fed. Rep. of Germany

[73] Assignee: VDO Adolf Schindling AG, Frankfurt am Main, Fed. Rep. of Germany

[21] Appl. No.: 273,159

[22] Filed: Jun. 12, 1981

[30] Foreign Application Priority Data

Jun. 14, 1980 [DE] Fed. Rep. of Germany ....... 3022398

[51] Int. Cl.³ ..................... G01F 23/00; G01F 23/24
[52] U.S. Cl. .................................. 73/295; 73/304 R; 364/509
[58] Field of Search ............. 73/304 R, 295; 364/509, 364/562

[56] References Cited

U.S. PATENT DOCUMENTS

| | | | |
|---|---|---|---|
| 3,911,744 | 10/1975 | Edwards ........................... | 73/304 R |
| 4,053,874 | 10/1977 | Glaser ............................... | 73/295 X |
| 4,126,041 | 11/1978 | Doir et al. ......................... | 73/295 |
| 4,129,848 | 12/1978 | Frank et al. ....................... | 73/295 X |
| 4,163,391 | 8/1979 | Bezard et al. .................... | 73/304 RX |
| 4,355,363 | 10/1982 | Colby et al. ...................... | 364/509 |
| 4,361,037 | 11/1982 | Hauschild et al. ............... | 73/295 |

FOREIGN PATENT DOCUMENTS

1236914  6/1971  United Kingdom ............. 73/304 R

*Primary Examiner*—Anthony V. Ciarlante
*Assistant Examiner*—Tom Noland
*Attorney, Agent, or Firm*—Martin A. Farber

[57] ABSTRACT

A device for the electric monitoring of the level of a liquid contained in a container, comprising at least one temperaturedependent resistance sensor immersed in the liquid the level of which is to be monitored, a constant current source being connectable to the resistance sensor under the control of a program control device controlling a device for detecting and storing the initial voltage drop on the resistance sensor at an initial time and the measurement voltage at a specified time after connection of the constant current source, and a device for evaluating the voltages by subtracting the measurement voltage from the initial voltage and under the circumstances inverting the difference to form a display voltage which corresponds to the level of the liquid. Several of these resistance sensors are arranged at different levels within the container, the sensors being connectable one after the other, controlled by the program control device, to the constant current source and to the device for evaluating the voltage drop on them. A fixed-value storage provides a supply of fixed-value voltages one of which respectively is selectably dependent on the respective resistance sensor active at the time, and an adder is appliable in order to form the display voltage, with the evaluated voltage which is analog to the depth of immersion of the active resistance sensor and with the fixed-value voltage which corresponds to the height of that resistance sensor.

7 Claims, 5 Drawing Figures

DEVICE FOR THE ELECTRIC MONITORING OF THE LEVEL OF A LIQUID CONTAINED IN A CONTAINER

BACKGROUND OF THE INVENTION

The present invention relates to a device for the electric monitoring of the level of a liquid contained in a container, having at least one temperature-dependent resistance probe immersed in the liquid the level of which is to be monitored, a source of constant current which can be connected to the resistance probe, which can be connected to the resistance probe under the control of a program control device means controlling a device for detecting and storing the initial voltage drop on the resistance probe at an initial time and the measurement voltage at a specified time after connection of the source of constant current; and means for evaluating said voltages by subtracting the measurement voltage from the initial voltage and under circumstances inverting the difference to form a display voltage which corresponds to the level.

One such known device (DE-OS No. 27 40 289) proceeds from the basis that the level of the liquid contained in a container can be measured by measuring the change in the resistance of a metallic resistance element as a function of the temperature which it assumes with a given flow of current. The mean temperature of the resistance probe depends on what portion of its total length is immersed in the liquid since the immersed section is cooled more strongly than the section present in the air. The total resistance of the resistance probe therefore depends on the level of the liquid. In order to make the result of the measurement more independent of variations in the surrounding temperature, the mean resistance which the resistance probe assumes upon the passage of current was referred to a mean resistance at an initial time when the resistance probe was not yet heated by the current. Specifically, the device comprises a source of constant current for the resistance probe from the terminals of which source the initial voltage is obtained at an initial time and the measurement voltage at a defined later time. The initial voltage is stored in a storage. When at said defined later time, the measurement voltage is present, the difference between the measurement voltage and the initial voltage is determined in a subtraction circuit. The difference can then be compared with given preestablished voltages which correspond to different levels of immersion of the resistance probe in order to produce a display or an alarm depending on the result of the comparison. This device, which operates in purely analog fashion, has the disadvantage that it is very dependent on the specific properties of the fluid to be measured, particularly an admixture of methanol in gasoline, which effects the thermal conductivity.

It is therefore already known, instead of using a single resistance probe which covers the entire measurement range within the container, to divide this measurement range up by individual resistance probes which are arranged at staggered heights within the container. The means for evaluating the voltage drops on the resistance probes, namely the initial voltage and the measurement voltage, comprise comparators which determine whether the corresponding resistance probe is or is not immersed in liquid. Depending on the result of the comparison, a predetermined signal is given off which corresponds to the height of the highest resistance probe which is immersed. With this incrementally operating level-measuring instrument by which a digital display can be effected, the error remains, in principle, less than the distance between two measureable level stops so that here the accuracy of the measurement can be improved as compared with purely analog measurement. The last-mentioned incrementally operating device, however, has the disadvantage that intermediate values between the individual levels are not determined so that in each case an error equal to the distance between levels must be expected. This error can be reduced in the manner that the increments are selected small which, however, means a large expense for apparatus since a correspondingly large number of resistance probes and corresponding elements of the control and evaluation devices must be provided.

SUMMARY OF THE INVENTION

The present invention therefore has the object of so further developing a device for electric level monitoring of the aforementioned type that the maximum possible error of measurement caused, in particular by the physical properties of the liquid to be measured remains limited as in a digital level measuring method but that despite relatively large increments which mean a low cost of manufacture, the measurement error caused by the stepwise measurement method also remains small.

The device is characterized by the invention in that as known per se, a plurality of resistance probes (1, 2, 3, 4) are arranged at different levels within the container, which probes can be connected one after the other, controlled by the program control means (18), to the source (6) of constant current and to the means (10, 12) of evaluating the voltage drop on them, that a fixed-value storage (15) for a supply of fixed-value voltages is provided, one of which can in each case be selected dependent on the respective resistance probe active at the time and that an adder (14) is provided which, in order to form the display voltage, can be applied with the evaluated voltage which is analog to the depth of immersion of the active resistance probe and with the fixed value voltage which corresponds to the height of that resistance probe.

By these means the important advantages are obtained that one determines, in the same way as in an incremental measurement process, what resistance probe is still entirely immersed so that a liquid level is accurately ascertained at a so-called corner point of a characteristic curve and that, starting from this corner point, it is furthermore ascertained what section of the next higher probe is immersed in the liquid. The measurement error due to an analog measurement of the immersed section of the highest probe still dipping into the liquid then refers only to the region of the level of this probe, but not to the entire region between the lowest measurable level and the actual level. Therefore there takes place for all practical purposes an interpolation, corresponding to the actual state of filling, of the fixed values which are defined by the differences in height of the discrete resistance probes. In other words, the errors possible by parallel conductances to the resistance probes caused by the measurement liquid refer then only to the resistance probe which is active at the time. In this way the total error of an analog display can be reduced in proportion to the reciprocal of the number of resistance probes. However, even with a small number of resistance probes a good approximation of the display voltage to the actual level of filling is possible.

The program control by which the individual resistance probes are activated is characterized by the fact that the cyclically proceeding program control is developed in the manner that within a measurement cycle the next higher resistance probe (for instance 2) above the highest fully immersed resistance probe (for instance 1) is connected and that the display voltage is formed from the voltage drops on this next higher resistance probe.

The program control therefore has the result that, starting from the lowest level, the individual resistance probes are measured until the display value is formed from the voltage drops on the resistance probe which is arranged above the highest resistance probe which is still fully immersed. The display value is formed in this connection by the addition of a fixed-value voltage which is associated with the level of this resistance probe and an analog voltage depending on the depth of immersion of the active resistance probe.

With this device it is possible even with a relatively large vertical spacing of the resistance probes, to obtain a good approximation to different container characteristics in the manner that the resistance probes (29 to 33) are formed with a cross section or width which is variable over their length to approximate the container shape characteristic. The cross section or width of the resistance probe over its length is selected in this connection in accordance with the slope of the tank characteristic curve.

Such resistance probes can be applied at little expense, particularly in the case of larger numbers, to a substrate (22) by the thick-film technology or the thin-film technology (FIG. 2).

With the above and other objects and advantages in view, the present invention will become more clearly understood in connection with the detailed description of a preferred embodiment, when considered with the accompanying drawings, of which:

BRIEF DESCRIPTION OF THE DRAWINGS

Referring to FIG. 1, four resistance probes (sensors) 1,2,3,4 are arranged at different heights, namely adjoining each other, within a container. The resistance probes can be connected individually to a source of constant voltage 6 via a switch group 5 containing corresponding switches 5a, 5b, 5c, 5d.

Figure 1:
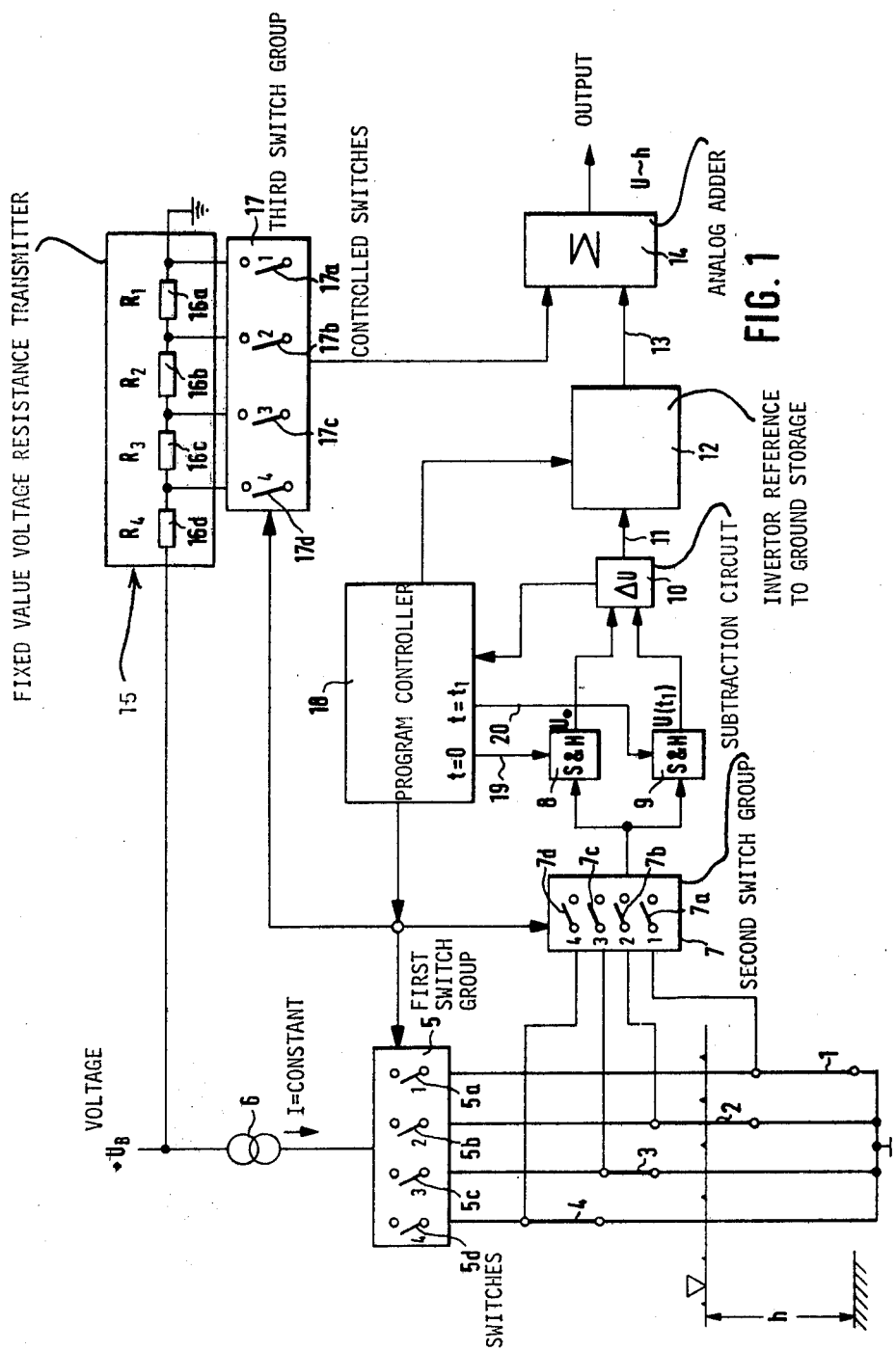
FIG. 1 is a block diagram of the device of the invention.

Each resistance probe can be connected via a second switch group 7 having the switches 7a, 7b, 7c, 7d to two sample and hold circuits 8 and 9. The outputs of these sample and hold circuits 8 and 9 are fed to a subtractor 10 whose one output 11 is connected to a circuit 12 for inverting the difference, which circuit furthermore has a memory action. One output 13 from this difference-inverting circuit 12 is connected to an input of an analog adder 14.

Another input of the analog adder 14 is connected with a fixed-value voltage circuit 15. This fixed-value voltage circuit comprises essentially a resistance network 16a, 16b, 16c, 16d which in the same way as the source of constant current is fed by a voltage $U_B$. Junction points of this resistance network can be connected to the adder 14 via controlled switches 17a, 17b, 17c, 17d. The switches 17a to 17d are components of a third switch group 17.

A device for program control 18 controls, in measurement cycles, the switch groups 5, 7 and from time to time 17 as well as the storage circuit 12 for the inversion of the difference. Further outputs 19 and 20 of the device 18 serve for controlling the sample and hold circuits 8 and 9. An input of the device 18 is connected to a second output of the subtractor which, in combination with the program control, effects the storage of the analog value with the circuit 12 and the delivery of a fixed voltage value by closing one of the switches 17a to 17d.

Figure 2:
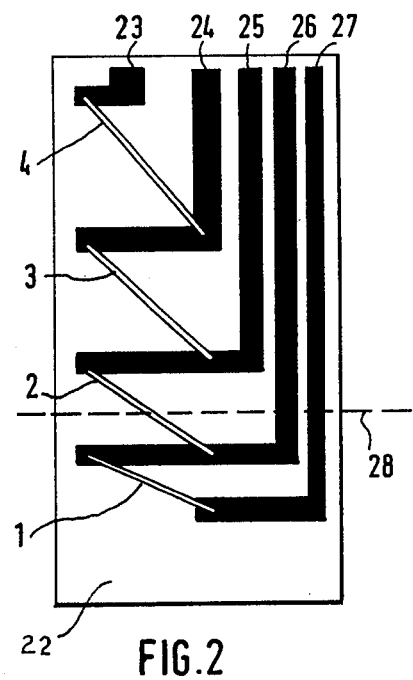
FIG. 2 is a side view of the resistance probes applied to a substrate.

The arrangement of the resistance probes 1 to 4 can be noted in detail from FIG. 2 in which these resistors are shown applied in thin film or thick film technology to a substrate 22. In FIG. 2 there can furthermore be noted lead wires 23 to 27 to the resistance probes, which are developed in the form of printed conductive tracks. The exemplified existing liquid level thereof is indicated by the dashed line 28 in FIG. 2.

Figure 3:
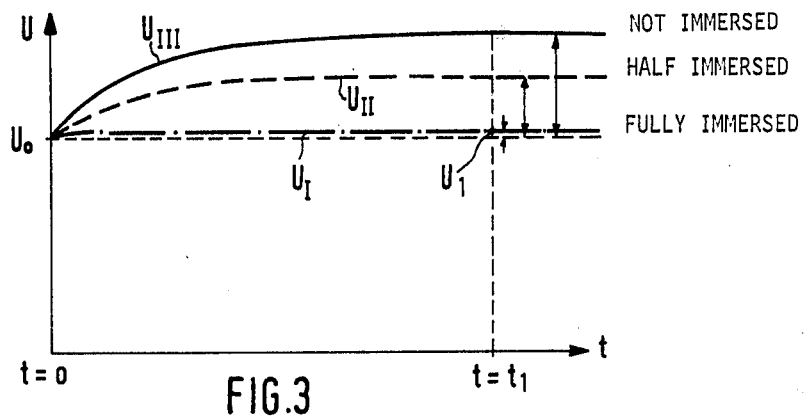
FIG. 3 is a characteristic curve of the voltage drop on a resistance probe as a function of the time of connection.

The program control device connects the switches 5a and 7a at the start of a measurement cycle. In this way the resistance probe 1 is applied at a time $t_0$ with a constant current, as a result of which there is a voltage drop $U_0$ over it (see FIG. 3). The voltage $U_0$ is fed via the switch 7a into the sample and hold circuit 8. After a predetermined time $t_1$ which may be about 1 to 2 seconds after $t_0$, the voltage drop $U_1$ then obtained over the resistance probe is stored in the sample and hold circuit 9. The voltage $U_1$ assumes a different value, corresponding to the voltage courses $U_I$, $U_{II}$, $U_{III}$ as a function of whether the resistance probe is fully immersed ($U_I$), fully not immersed ($U_{III}$) or only partially immersed ($U_{II}$). The subtractor 10 forms the difference between the voltages $U_1 - U_0$. If the voltage difference, as is to be assumed in accordance with FIG. 2, is practically zero when the resistance probe 1 is fully immersed, the resistance probe 2 which is only half immersed will then be applied in a similar manner with a constant current. Accordingly, the subtractor 10 determines a greater voltage difference $U_1 - U_0$ since the only partially immersed resistance probe 2 can heat up more strongly and gives a corresponding command to the program control means 18. The switch 17b, associated with the resistance probe 2, in the third switch group of the fixed-value voltage circuit 15 is closed so that a fixed predetermined voltage is fed into the analog adder 14, which voltage indicates that the resistance probe 1 is entirely immersed but the resistance probe 2 is still not completely immersed. To this fixed-voltage value there is added a voltage which corresponds to the height of immersion of the resistance probe 2 and therefore is analog to this height of immersion. This is done by the inversion of the voltage difference $U_1 - U_0$ by the circuit arrangement 12 and the storage of this voltage value. In this connection a potential adjustment—with respect to ground—can also be carried out. At the output of the analog adder 14 there can therefore be tapped off a display voltage which incrementally contains in analog manner the completely immersed resistance probe 1 and the depth of immersion of the next higher resistance probe 2. This display voltage is held until the next measurement cycle.

Figure 4:
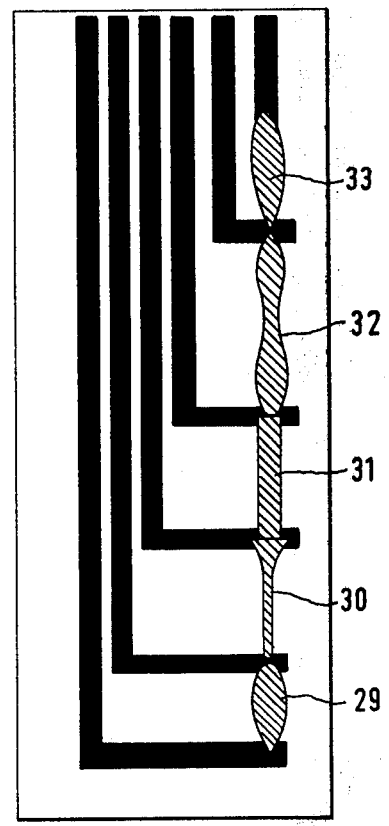
FIG. 4 is a variant of the resistance probes

FIG. 4 shows probes 29, 30, 31, 32, 33, with corresponding lead wires (not shown), which are applied to a substrate and make possible precise approximation to a special tank characteristic curve. For this purpose the individual resistance probes have different diameters or widths along their longitudinal direction. The change in the resistance of each resistance probe along its length which corresponds to the possible change in level depends in this connection on the width of the resistance probe, i.e. relatively wide sections of the resistance probe produce only a relatively slight change in the total resistance of the resistance probe and conversely thinner sections produce a large resistance change in the total resistance. These resistance changes are taken into consideration in connection with the analog voltage portion of the display voltage.

Figure 5:
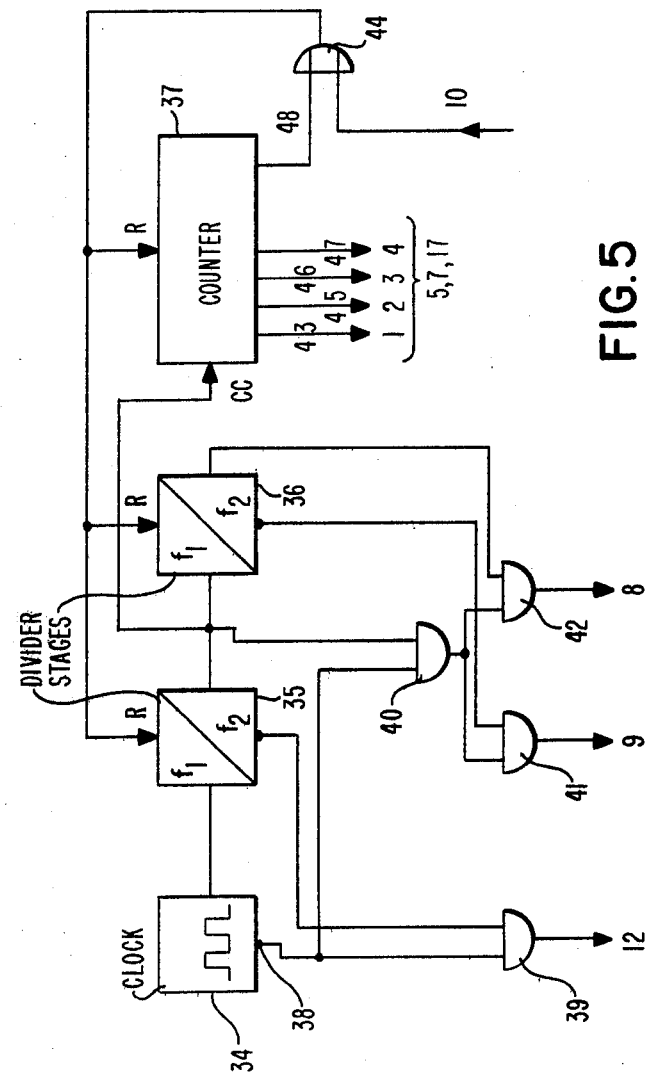
FIG. 5 shows an embodiment of the program controller.

FIG. 5 shows an embodiment of the device for program control 18. The device consists of a clock 34 generating a constant number of pulses per time unit, two divider stages 35 and 36 which are connected in series and fed with the sequence of pulses, and a counter 37 the clock input of which is connected to the divider stage 35.

The negative output 38 of the clock 34 and the negative output of the divider stage 35 are connected with a first AND-gate 39, the output of which controls the difference-inverting circuit 12. The negative output 38 is further connected to a first input of a second AND-gate 40. The other input of this AND-gate 40 is fed with the output pulses of the divider stage 35. The negative and positive outputs of the divider stage 36 are combined with the output of the AND-gate 40 in two further AND-gates 41 and 42 the output of which are connected to the sample and hold circuit 8 and the sample and hold circuit 9, respectively.

At the start of a measurement cycle the counter 37 if fed with pulses from the clock 34 via the divider stage 35 and counts up therefore from zero. At the time that a signal occurs in the first output 43 of the counter 37 and operates the switches 5a, 7a and 17a in a conducting state. At the same time the sample and hold circuit 8 is activated by the output signal of the AND-gate 42 to store the voltage drop $U_0$. After the predetermined time $t_1$ the sample and hold circuit 9 is activated by the output signal of the AND-gate 41 to store the voltage drop $U_1$.

If there is an important difference between the voltage drops $U_0$ and $U_1$, the output signal of the subtractor 10 resets the counter 37 as well as the divider stages 35 and 36 via the OR-gate 44 to zero and the circuit 12 is activated by the output signal of the AND-gate 39 to generate an output signal.

If, however, the voltage difference is practically zero the counter continues to count and this leads to a signal in the second output 45 of the counter 37 by which the switches 5b, 7b and 17b are actuated. The voltage drop $U_1$ stored in the sample and hold circuit 9 is now deemed to be the voltage drop "$U_i$" for the second probe 2 and the new voltage drop $U_2$ is stored in the sample and hold circuit 9. Now, the difference between the voltage drops $U_1$ and $U_2$ is formed and, if the voltage difference is practically zero, the counter continues to count.

If all differences formed between the different voltage drops are practically zero, a signal occurs in the output 48 of the counter 37 by which the counter 37 as well as the divider stages 35 and 36 via the OR-gate 44 are reset to zero. Now a new measurement cycle can start.

While there have been disclosed embodiments of the invention, it is to be understood that these embodiments are given by example only and not in a limiting sense.

We claim:

1. In a device for the electric monitoring of the level of a liquid contained in a container, comprising at least one temperature-dependent resistance sensor immersed in the liquid, the level of which is to be monitored, a source of constant current connectable to the resistance sensor under the control of a program control means controlling a means for detecting and storing the initial voltage drop on the resistance sensor at an initial time and a further voltage drop on the resistance sensor at a specified time after connection of the source of constant current, and means for evaluating said voltages by subtracting the further voltage from the initial voltage to form a display voltage which corresponds to the level of the liquid, the improvement comprising a temperature-dependent resistance sensor unit comprising a plurality of oblong resistance sensors which includes said at least one sensor, said plurality of sensors being arranged at different levels within the container, said resistance sensors being connected one to the other, and wherein each connecting point as well as the free end of the first and of the last resistance sensor are connected to leads, respectively, said program control means connecting said resistance sensors one after the other to the source of constant current and to said means for evaluating the voltage drop thereon, a fixed-value storage means for supplying fixed-value voltages corresponding to differing depths of submerged sensors, each one of which fixed value voltages is selectably dependent on the respective one of said resistance sensors which is partially immersed at the time, said program control means including means responsive to an evaluation of voltage drops by said evaluating means for substituting a fixed-value voltage from said fixed-value storage means in place of a sum of values of voltage from said evaluating means for such ones of said resistance sensors which are totally immersed, and adder means for forming the display voltage by adding an evaluated voltage from said evaluating means corresponding to the depth of immersion of said partially immersed resistance sensor with one of said fixed-value voltages which corresponds to the height of said partially immersed resistance sensor.

2. The device as set forth in claim 1, wherein said program control means is connecting, during a measurement cycle, that resistance sensor which is next highest in level above the highest fully immersed resistance sensor to said source of constant current whereby the display voltage is formed from the voltage drops on said next highest resistance sensor.

3. The device as set forth in claim 1 or 2, wherein said resistance sensors throughout their lengths are formed with a cross section which is varied for a correspondingly varied shape characteristic of the container.

4. The device as set forth in claim 1 or 2, wherein said resistance sensors throughout their lengths are formed with a width which is varied for a correspondingly varied shape characteristic of the container.

5. The device as set forth in claims 1 or 2, wherein said resistance sensor unit comprises:
a substrate, and wherein
said resistance sensors are constructed of thin films, respectively, disposed on said substrate and applied on said substrate by thin film technology.

6. The device as set forth in claims 1 or 2, wherein said resistance sensor unit comprises:
a substrate, and wherein
said resistance sensors are constructed of thick films, respectively, disposed on said substrate and applied on said substrate by thick film technology.

7. A device for monitoring the level of a liquid in a container comprising:
a set of temperature-dependent resistance elements to be disposed at differing depths within said container;
means for applying pulses of current sequentially to each of said resistance elements, each of said elements generating heat and a voltage drop in response to a pulse of said current;
means for measuring the voltage drop of each of said resistance elements at the beginning and the end of each of said current pulses to provide a pair of measurements of each voltage drop;
means for subtracting said measurements from each other in each of said pairs of measurements to detect a differential voltage drop, a minimal change in measurement indicating total immersion of a resistance element;
means for inverting the value of said differential voltage drop when said differential voltage drop is in excess of said minimal change, an excess indicative of only partial immersion of a resistance element, in order to provide an inverted value;
means for storing reference voltage values corresponding to depths of the resistance elements;
means coupled between said subtracting means and said storing means for substituting a stored reference value in place of a sum of corresponding minimal values of differential voltage for a set of totally submerged ones of said resistance elements; and
means coupled to said substituting means and said subtracting means for adding the inverted value of differential voltage drop to said stored reference value for display of liquid level.

* * * * *